US012564528B2

(12) United States Patent
Williams

(10) Patent No.: US 12,564,528 B2
(45) Date of Patent: Mar. 3, 2026

(54) AIR CONTROLLED PRESSURE OFF LOADING DEVICES

(71) Applicant: Nicholas Williams, South Euclid, OH (US)

(72) Inventor: Nicholas Williams, South Euclid, OH (US)

( * ) Notice: Subject to any disclaimer, the term of this patent is extended or adjusted under 35 U.S.C. 154(b) by 183 days.

(21) Appl. No.: 18/516,445

(22) Filed: Nov. 21, 2023

(65) Prior Publication Data

US 2025/0161131 A1 May 22, 2025

(51) Int. Cl.
*A61G 7/10* (2006.01)

(52) U.S. Cl.
CPC .................................. *A61G 7/1021* (2013.01)

(58) Field of Classification Search
None
See application file for complete search history.

(56) References Cited

U.S. PATENT DOCUMENTS 5,168,589 A * 12/1992 Stroh ................. A61G 7/05769 5/710
6,966,081 B1 * 11/2005 Sharps ................. A61G 7/1046 5/81.1 R
2006/0021146 A1 * 2/2006 Tokarz ................. A47C 27/081 5/632
2017/0216117 A1 * 8/2017 Rigoni ..................... A61G 1/01

FOREIGN PATENT DOCUMENTS

WO WO-2018203451 A1 * 11/2018 ............... A61H 7/00

* cited by examiner

*Primary Examiner* — Adam C Ortiz
(74) *Attorney, Agent, or Firm* — Daniel M. Cohn; Howard M. Cohn

(57) ABSTRACT

An air controlled off-loading device that provides the ability for a less mobile individual to adjust themselves in bed with or without the assistance of a caregiver as well as allowing a caregiver to boost this individual up in a bed or chair in the home setting. The device includes a rectangular pad having a plurality of attachment sites for removably attaching inflatable wedges. The attachment sites including a plurality of hook and loop fasteners mounted to the upperside of the pad. A plurality of inflatable wedges are removably secured to the plurality of hook and loop fasteners mounted to the upperside of the pad.

11 Claims, 6 Drawing Sheets

AIR CONTROLLED PRESSURE OFF LOADING DEVICES

FIELD OF THE INVENTION

The present invention relates generally to an air controlled off loading device, and more particularly to an air controlled off loading device to allow less mobile individuals to be repositioned in bed to off load bony prominences independently or with the help of a caregiver. This product is not designed, nor is it meant to be used in the hospital setting or in the field of healthcare by health professionals or allied health fields. This product is derived to be used in an individual's home with or without assistance from a family member or caregiver.

BACKGROUND OF THE INVENTION

People generally sleep in three basic positions: on the back, on the stomach, and on the side. Sleeping on one's side comfortably may be difficult for any of the following reasons: (1) poor neck and head alignment; (2) upper arm tension or pulling on the shoulder; (3) sciatic pressure due to poor lower back alignment; (4) leg tension or pulling on the hip; and (5) top leg pressure on the bottom leg. Discomfort from these sources may cause difficulty falling asleep. The root cause of these problems comes from gravity and the interaction between the mattress and the sleeper.

Although mattresses that conform to the contour of the body, adjustable beds, and special pillows have been developed to assist in helping people get comfortable when sleeping, none of these solutions provides an optimal arrangement. For example, a skeletal support pillow for conforming to the bodily skeletal dimensions of a user uses a single pillow having dimensions relative to the user's body that allow the user to rest in a physiologically neutral position. Each pillow is custom fitted to the skeletal dimensions of the user and it therefore not readily adapted for mass production or for adapting to the changing dimensions of the user or changing needs of the user, once made.

In another system, separately adjustable pillows characterized by a plurality of separately inflatable and deflatable pillows which may be emptied or filled with fluid, such as air, via a manifold having valves for each pillows. The manifold with valves for each container, while having certain advantages in healthcare applications where a nurse may readily adjust a plurality of pillows from a single bedside location, also has some drawbacks. Specifically, the single manifold with a plurality of remotely-mounted valves requires connecting tubes to be run to each of the pillows, which may cause the user to become tangled in the tubing, or may limit the user to a particular orientation or distance of the pillows relative to the manifold.

When individuals have gross functional weakness or mobility limiting pathologies (ex. Spinal cord injuries, stroke, amputation, etc.) they may be immobilized in bed with little ability to rotate or adjust their body. Within a matter of hours without moving in a supine, sidelying, or prone position, individuals can start to develop wounds that can lead to other serious complication. These wounds develop on bony prominences like the sacrum, coccyx, greater trochanter, spinous processes, and inferior angle of the scapula. Some individuals have a caregiver that can help with rolling or turning, but it requires considerable strength and safe techniques to be effective and to minimize caregiver risk or burden.

In hospital systems, different types of beds can work to adjust patient positions using sand, air, or water capabilities, but this technology less widely available or used once an individual is at home. Furthermore, the previously mentioned technologies do not readily assist in turning to help individuals roll to get cleaned up, bathed, changed, or to get out of bed.

Foam or air-based wedges are another option at home to rotate an individual, but requires a skilled and strong caregiver to roll the full body weight of a person and then tuck the wedge while holding the person sidelying. These wedges only incline an individual up to 30 degrees, which is not enough to completely off weight posterior bony prominences and would still require considerable strength to roll this individual to sidelying position to get bathed, cleaned, or to provide wound care. Current recommendations are to rotate every 2 hours (day and night). After 2 hours, an individual needs to be rolled and wedges need to be positioned on the contralateral side using another heavy rolling technique. This is a very straining and exhausting process for the caregiver and individual, so many caregiver that are not in ideal physical shape may be unsuccessful taking care of less mobile individuals.

Furthermore, these wedges are not firmly attached to a bed-position boosting system, so as someone is boosted, the wedges are generally left behind and need to be realigned. Air based wedges on the market require plugging in an air compression device, which will be out of the individual' reach while lying in bed and do not have remote control capabilities. So, an individual would never be independent at home using manually placed wedges and would require 24 hour assistance, which is difficult for many people.

If an individual had technology to allow independent rolling and turning, less mobile populations could be able to have an increased quality of life with lower risks of pressure ulcers and may not require 24 hour support at home. This may allow individuals to be successful at home with less ideal support systems rather than needing to stay at a long term or skilled nursing facility.

SUMMARY

In one embodiment, there is provided an air controlled off loading device that provides the ability to boost less mobile individuals in bed. The device includes a rectangular pad having a plurality of attachment sites for removably attaching inflatable wedges. The attachment sites including a plurality of hook and loop fasteners mounted to the upperside of the pad. A plurality of inflatable wedges are removably secured to the plurality of hook and loop fasteners mounted to the upperside of the pad;

BRIEF DESCRIPTION OF THE DRAWINGS

The structure, operation, and advantages of the present invention will become further apparent upon consideration of the following description taken in conjunction with the accompanying figures (FIGs.). The figures are intended to be illustrative, not limiting.

Certain elements in some of the figures may be omitted, or illustrated not-to-scale, for illustrative clarity. The cross-sectional views may be in the form of "slices", or "near-sighted" cross-sectional views, omitting certain background lines which would otherwise be visible in a "true" cross-sectional view, for illustrative clarity. Furthermore, for clarity, some reference numbers may be omitted in certain drawings.

DETAILED DESCRIPTION

Figure 1:
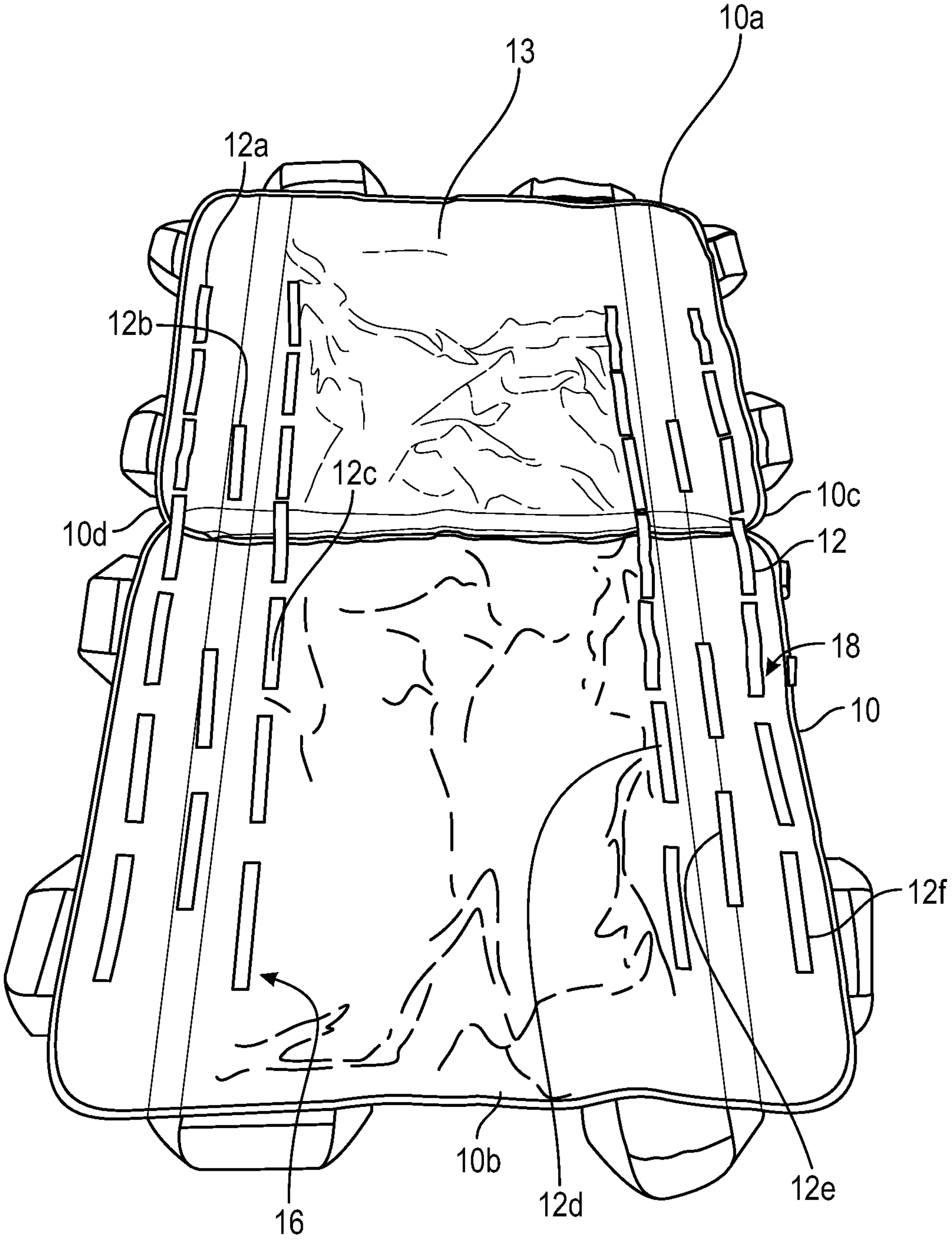
FIG. 1 is a top view of a rectangular pad having strips of hook and loop fasteners and a plurality of handles disposed along the four sides, according to the present invention.

In the description that follows, numerous details are set forth in order to provide a thorough understanding of the present invention. It will be appreciated by those skilled in the art that variations of these specific details are possible while still achieving the results of the present invention. Well-known processing steps are generally not described in detail in order to avoid unnecessarily obfuscating the description of the present invention.

In the description that follows, exemplary dimensions may be presented for an illustrative embodiment of the invention. The dimensions should not be interpreted as limiting. They are included to provide a sense of proportion. Generally speaking, it is the relationship between various elements, where they are located, their contrasting compositions, and sometimes their relative sizes that is of significance.

In the drawings accompanying the description that follows, often both reference numerals and legends (labels, text descriptions) will be used to identify elements. If legends are provided, they are intended merely as an aid to the reader, and should not in any way be interpreted as limiting.

Figure 2:
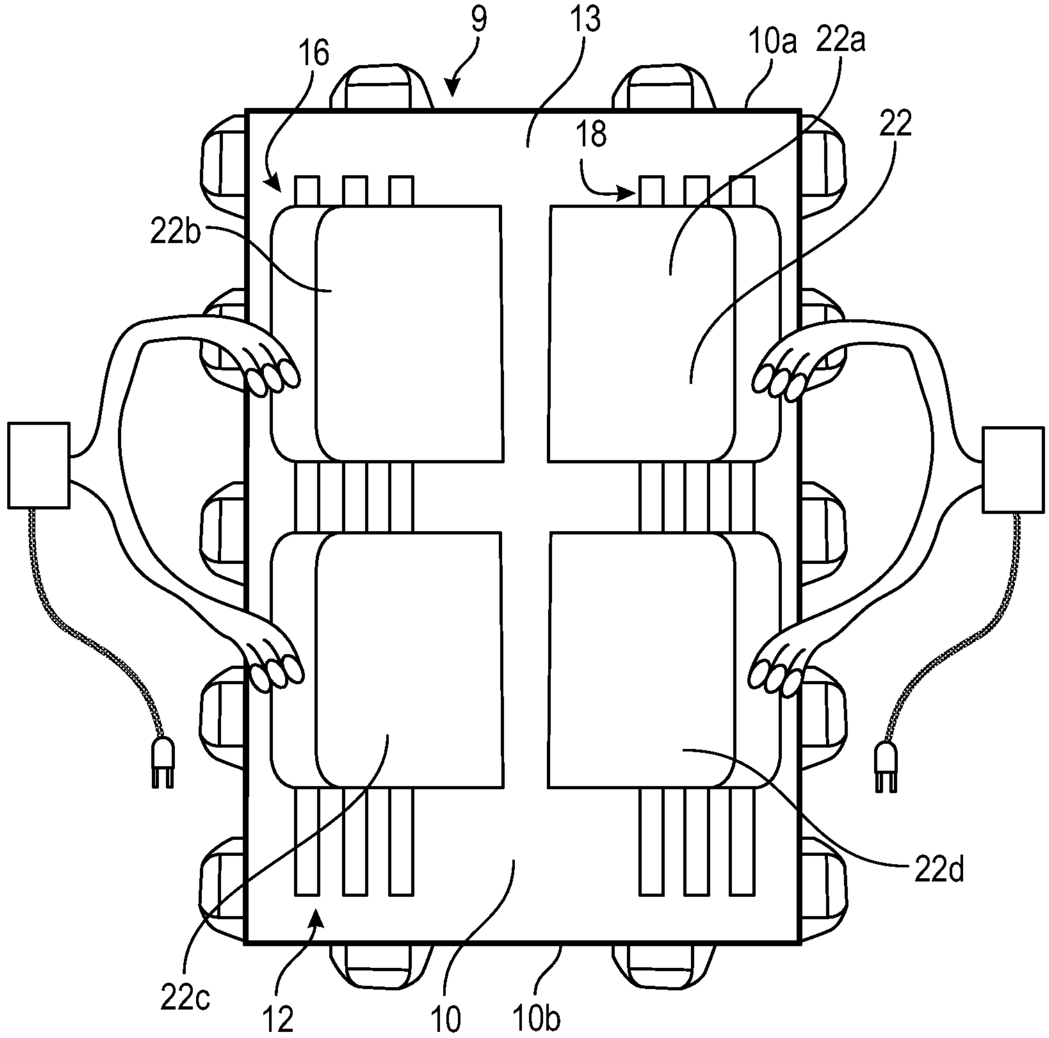
FIG. 2 is a top view of a rectangular pad of FIG. 1 having a plurality of inflatable compartment wedges disposed on the pad and interconnected to air pumps, according to the present invention.

Less mobile individuals often have to be repositioned in bed to offload bony prominences with the help of a caregiver. This piece of equipment will assist in this process and allow the individual to re-position themselves when placed correctly. To use this piece of equipment, the individual should be placed on an air controlled, offloading device 9 as shown in FIG. 2. The air controlled, offloading device 9 includes a rectangular pad 10 as shown in FIG. 1. The pad 10 is water resistant and machine washable sheet that provides the ability to boost, less mobile individuals in bed and has a plurality of attachment sites 12 providing for the removably attachment of the inflatable wedges 22.

The attachment sites 12 include a plurality of hook and loop fasteners 12*a*, 12*b*, 12*c*, 12*d*, 12*e*, 12*f* (12*a*-12*f*) that are disposed on the outer facing surface 13 and extend from near the end 10*a* of the pad 10 to near the opposite end 10*b*. The hook and loop fasteners are fixedly attached to the pad 10 by any desirable means such as an adhesive like glue. They are preferably mounted in two sets 16 and 18 of three that are placed along the length of the pad and spaced from each other. The two sets of strips 16 and 18 allow the position of the inflatable compartment wedges 22. The strips 16 and 18 are separated along a vertical axis extending between the ends 10*a* and 10*b* of the pad 10 to offload the spinous processes of vertebrae and the sacrum. Preferably, the vertical axis is spaced equidistant between the sides 10*c* and 10*d* of the pad 10 and extends the length of the pad.

Figure 3:
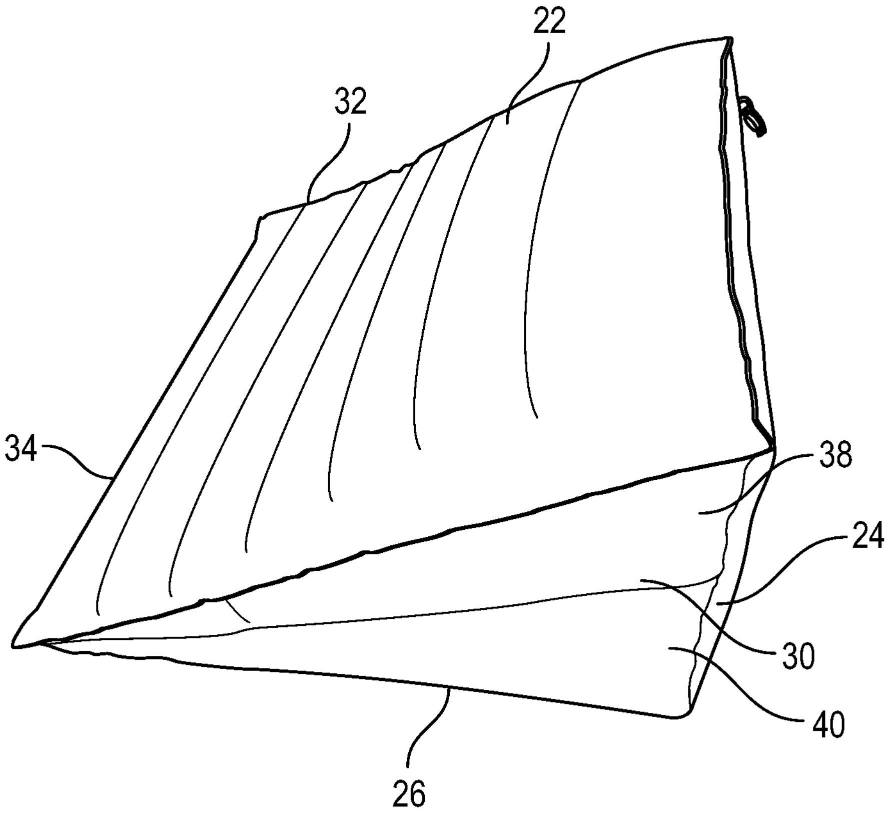
FIG. 3 is a three-dimensional side view of a fully inflated compartment wedge, according to the present invention.
Figure 5:
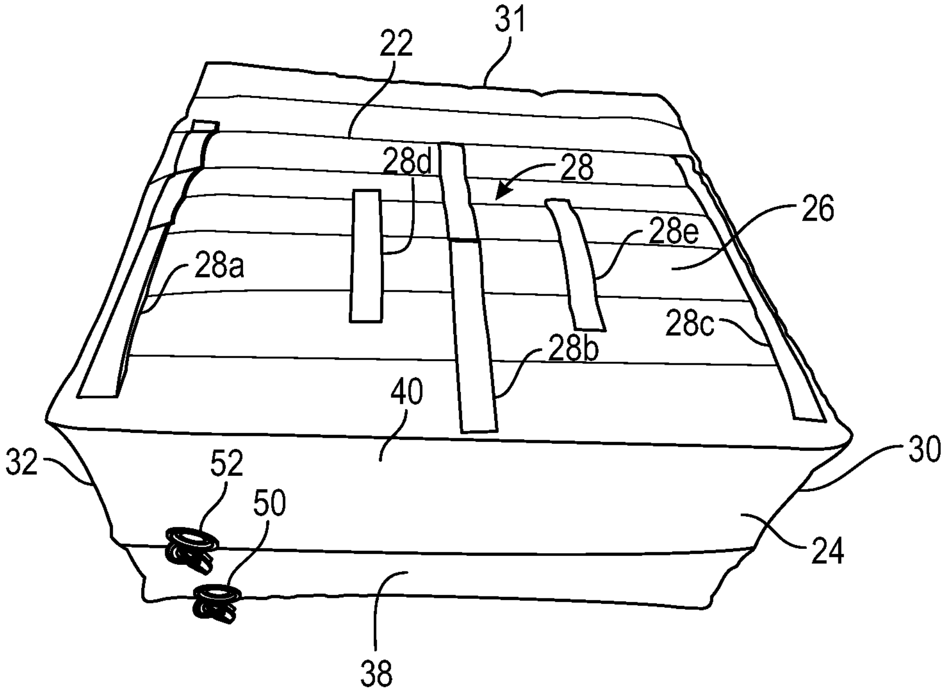
FIG. 5 is a bottom view of an inflatable compartment wedge showing strips of hook and loop fasteners for attaching the inflatable compartment wedge to the rectangular pad of FIG. 1, according to the present invention.
Figure 6:
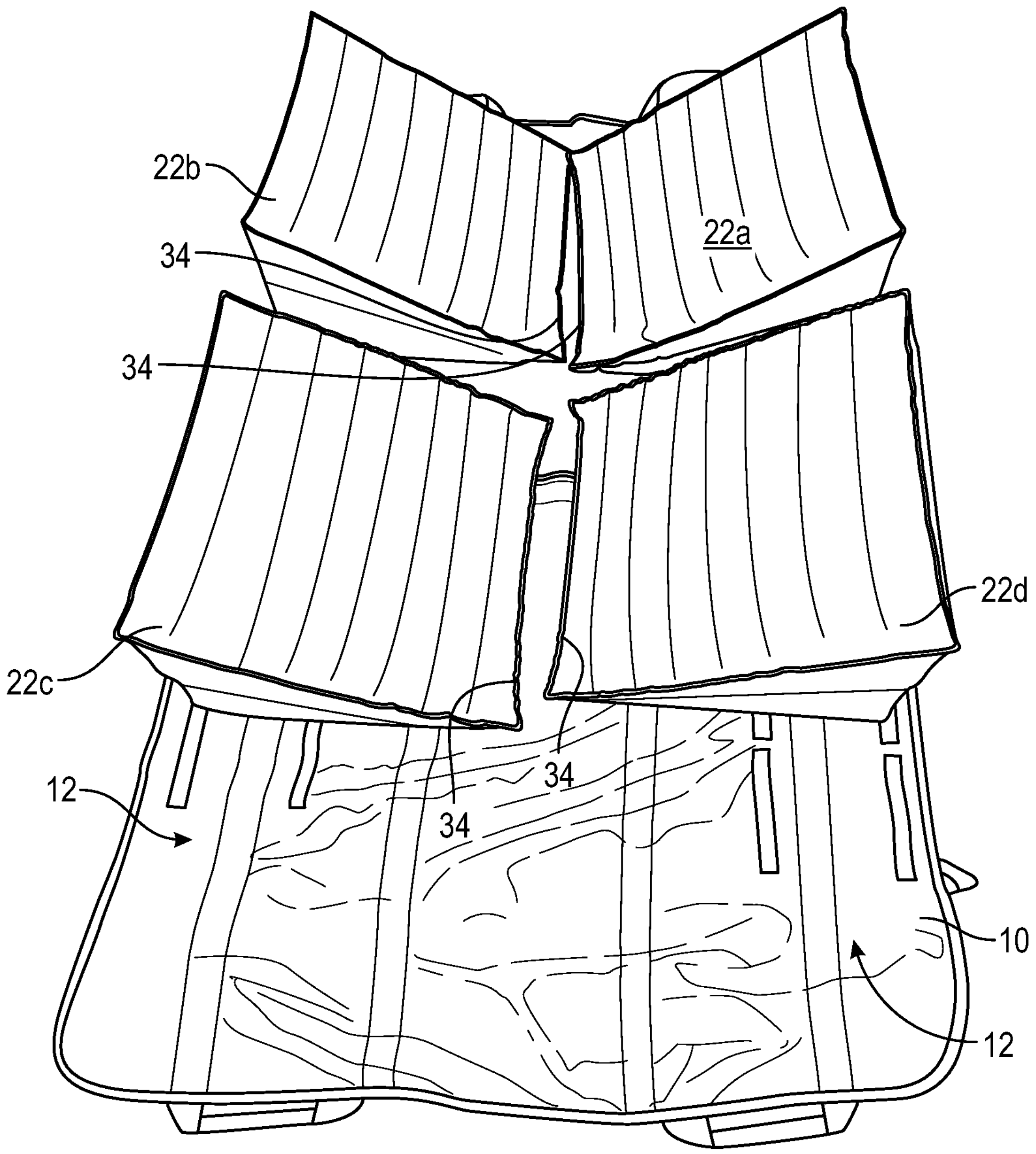
FIG. 6 is a top view of a plurality of inflated compartment wedges attached to the rectangular pad of FIG. 1, according to the present invention.

A plurality of inflatable wedges 22 can be removably secured to the plurality of hook and loop fasteners 12*a*-12*f* on pad 10 as shown in FIGS. 2, 3, and 6. Each inflatable wedge 22, when inflated, has a rear surface 24 which extends perpendicular to a flat bottom surface 26, when the wedge is secured to the outer surface 13 of pad 10. The flat bottom surface 26 of wedge 22 rests on the outer surface 13 of the pad 10, as shown in FIG. 5. A plurality of hook and loop fasteners strips 28 are secured to the bottom surface 26 of the wedges 22. The plurality of hook and loop fasteners strips 28 can include three elongated strips 28*a*, 28*b* and 28*c* which are disposed on the outer edges near side surfaces 30 and 32 and on the center of the bottom surface 28. Two shorter strips 28*d* and 28*e* are secured to the bottom surface 26 with one strip 28*d* between strip 28*a* and 28*b* and the other strip 28*e* between 28*b* and 28*c*. The two side surfaces 30 and 32 of the wedges 22 have a triangular shape that extends from the rear surface 24 to the front edge 34.

Figure 4:
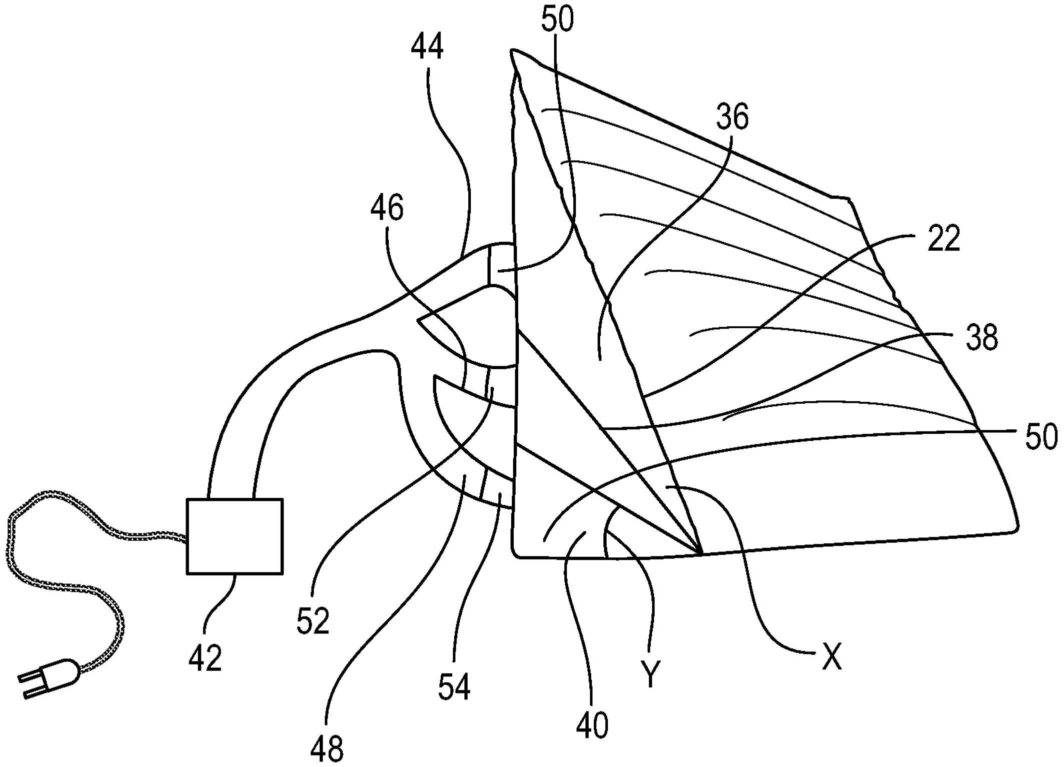
FIG. 4 is a side view of a fully inflated compartment wedge mounted to an air pump, according to the present invention.

As shown in FIG. 4, the wedges 22 can be formed with three compartments 36, 38 and 40 stacked upon each either. The three components 36, 38 and 40 are connected to an air pump 42 by three air lines 44, 46 and 48, respectively. Each of the air lines 44, 46 and 48 have an air valves 50, 52, and 54. In operation, each compartment 36, 38 and 40 fills independently. The first compartment to fill is the bottom compartment 40 and when it fills, the next compartment 38 fills and finally when it is fully inflated, the compartment 36 fills. The pump 42 is controlled by a controller that is attached to the pump and can be handheld by the individual or the caregiver. The lines 44, 46 and 48 are attached to the compartments 36, 38 and 40, respectively, so that when the pump 42 stops, the wedges maintain their pressure. This can be accomplished by valves in the tubing or by independently connecting the lines 44, 46 and 48 to the pump.

While the wedge 22 is shown with three compartments 36, 38 and 40, It is also within the terms of the invention to construct the wedge 22 with two compartments as shown in FIGS. 3 and 4.

The inclusion of 2 or 3 isolated compartments allows a caregiver or the individual themselves to adjust the degree of incline up to about a total angle x of 60 degrees via remote to air pump. With two wedges, each wedge can have an angle y of 20°. A caregiver or individual can control to which degree of incline is inflated to allow them to roll to off weight bony prominences (partially or completely), to get into a more comfortable position, or to assist with cleaning, bathing, or general care for the individual. This device is made for all bed surfaces within the home setting. This is not designed to be used in the hospital or in other healthcare settings.

As shown in FIG. 2, the wedges 22 can be disposed on the hook and loop fasteners 12*a*-12*f* so that the three elongated strips 28*a*, 28*b* and 28*c* are temporarily affixed with the three elongated strips 28*a*, 28*b* and 28*c* disposed across the fasteners 12*a*-12*f*.

As shown in FIG. 1, the pads 10 have a plurality of handles 20 along each side 10*a*, 10*b*, 10*c*, and 10*d* (10*a*-10*d*). The handles 20 enable a caregiver to move the pad when a less mobile individual is on the pad.

As shown in FIG. 6, four wedges 22*a*, 22*b*, 22*c*, and 22*d* are temporarily secured to the hook and loop fasteners on pad 10. Note that are arranged with their from edges 34 facing each other and separated along a vertical axis extending between the ends 10*a* and 10*b* of the pad 10. The spacing between the wedges enables one to offload the spinous processes of vertebrae and the sacrum.

Although the invention has been shown and described with respect to a certain preferred embodiment or embodiments, certain equivalent alterations and modifications will occur to others skilled in the art upon the reading and understanding of this specification and the annexed drawings. In particular regard to the various functions performed by the above described components (assemblies, devices, circuits, etc.) the terms (including a reference to a "means") used to describe such components are intended to correspond, unless otherwise indicated, to any component which performs the specified function of the described component (i.e., that is functionally equivalent), even though not structurally equivalent to the disclosed structure which performs the function in the herein illustrated exemplary embodiments of the invention. In addition, while a particular feature of the invention may have been disclosed with respect to only one of several embodiments, such feature may be combined with one or more features of the other embodiments as may be desired and advantageous for any given or particular application.

What is claimed is:

1. An air controlled off-loading device that provides the ability to boost a less mobile individual in bed, the bed having a longitudinal direction and a transverse direction; comprising:

- a substantially rectangular pad having a plurality of attachment sites for removably attaching inflatable wedges, the plurality of attachment sites comprising a plurality of hook and loop fasteners mounted to an upperside of the pad;
- a plurality of inflatable wedges removably secured to the plurality of hook and loop fasteners mounted to the upperside of the pad;
- wherein each of the plurality of inflatable wedges is formed of two or three inflatable compartments removably secured to the upperside of the pad and is connected to an air pump by three respective air lines; wherein each of the plurality of inflatable wedges has a rear surface which extends perpendicular to the pad when the wedge is secured to the pad, and further has a bottom surface that rests on the upper facing surface of the pad; wherein each of the plurality of inflatable wedges has two side surfaces, which are each a triangular shape that extends from the rear surface of the wedge to a front edge of the wedge;
- wherein each of the plurality of inflatable wedges have the same shape in operation and are configured to support the individual in the transverse direction;
- wherein an orthogonal projection of each of the plurality of inflatable wedges on the bottom surface of the wedge is located within a perimeter of the rectangular pad;
- wherein the hook and loop fasteners are mounted in two sets of three that are placed along the length of the pad and spaced from each other; wherein each set of three hook and loop fasteners is a set of three columns of hook and loop fasteners that are arranged adjacent to a corresponding long edge of the pad, wherein each column comprises a plurality of hook and loop fasteners;
- wherein the rectangular pad comprises a plurality of handles along each side of the pad to enable a caregiver to move the pad when an individual is on the pad.

2. The air controlled off-loading device of claim 1 wherein the pad is formed of a machine washable sheet.

3. The air controlled off-loading device of claim 2 wherein the pad is water resistant.

4. The air controlled off-loading device of claim 3 wherein the hook and loop fasteners are fixedly attached to the pad.

5. The air controlled off-loading device of claim 1 wherein the two sets of strips of hook and loop fasteners allow the adjustment of the position of the inflatable wedges.

6. The air controlled off-loading device of claim 5 wherein the two sets of strips of hook and loop fasteners strips are separated along a vertical axis to allow for the offloading of the spinous vertebrae and the sacrum.

7. The air controlled off-loading device of claim 1 wherein a plurality of hook and loop fasteners strips are secured to the bottom surface of the inflatable wedgers.

8. The air controlled off-loading device of claim 7 wherein two of the plurality of hook and loop fasteners strips are disposed on the outer edges of the pad and on the center of the bottom surfaces of the pad and the two shorter strips of hook and loop fasteners strips are disposed with one between one of the longer strips and the center strip and the other of the two longer strips is disposed between the center strip and the other longer strip.

9. The air controlled off-loading device of claim 1 wherein each of the three inflatable compartments are filled independently with the bottom compartment filled first followed a middle inflatable compartment and a top inflatable compartment when the middle inflatable compartment is fully inflated.

10. The air controlled off-loading device of claim 9 wherein the inflatable compartments are filled an air line connected with a pump controlled by a remote controller that is attached to the pump and operated by the individual or caregiver.

11. The air controlled off-loading device of claim 10 wherein and each of the air lines has a valve in the line for independently closing the line when the pump is disconnected.

* * * * *